J. BIJUR.
ELECTRICAL APPARATUS.
APPLICATION FILED FEB. 8, 1912. RENEWED NOV. 2, 1918.
1,304,935.
Patented May 27, 1919.
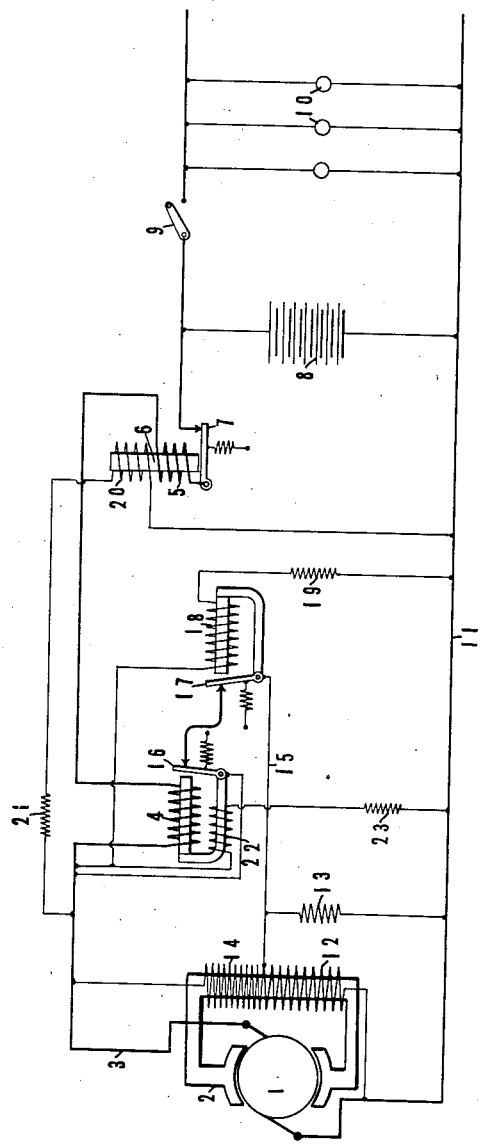
WITNESSES
INVENTOR
Joseph Bijur
BY
ATTORNEYS

UNITED STATES PATENT OFFICE.

JOSEPH BIJUR, OF NEW YORK, N. Y., ASSIGNOR, BY MESNE ASSIGNMENTS, TO BIJUR MOTOR APPLIANCE COMPANY, A CORPORATION OF DELAWARE.

ELECTRICAL APPARATUS.

1,304,935.  Specification of Letters Patent.  Patented May 27, 1919.

Application filed February 8, 1912, Serial No. 676,263. Renewed November 2, 1918. Serial No. 260,919.

*To all whom it may concern:*

Be it known that I, JOSEPH BIJUR, a citizen of the United States, residing at New York, in the county of New York and State of New York, have invented certain new and useful Improvements in Electrical Apparatus, of which the following is a full, clear, and exact description, such as will enable others skilled in the art to which it appertains to make and use the same.

This invention relates to electrical apparatus, and with regard to the more specific features thereof, to electrical regulating apparatus. One of the objects thereof is to provide efficient means for reducing sparking in apparatus of the above nature. Another object is to provide practical and durable regulating apparatus which shall be sensitive in action and accurate in results. Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

This application is concerned with an improvement on my copending application Serial No. 598,532, filed December 21, 1910, and the matter common to the two applications is included in the claims of the latter.

The accompanying drawing is a diagrammatic view of one of various possible embodiments of this invention.

As shown in this drawing, 1 represents a generator having the field magnet 2. From one terminal of this generator the main 3 passes through a series regulating coil 4 and then a series coil 5 upon the main switch 6 to the contact 7, which, in closed condition, leads the current to a storage-battery 8 and through switch 9 to lamps 10, connected in parallel as shown. The remaining terminal of the generator is provided with the main 11 leading from the battery and lamps.

The shunt field winding 12 is preferably connected across the mains in parallel with a resistance element 13 and in series with a resistance coil 14 so wound upon the field magnet as to aid the shunt field winding 12. A shunt 15 is normally closed about the coil 14 but may be broken at two points, respectively controlled by the spring-retracted contacts 16 and 17. The former contact is substantially controlled by the series coil 4 and the latter by a voltage coil 18 connected across the mains in series with a resistance element 19.

A voltage coil 20 is mounted upon the main switch 6 and serially connected across the mains with resistance element 21, the functions of this coil and coil 5 being merely those of the voltage and series coils of the ordinary well-known main switch.

There is preferably provided upon the magnet bearing the coil 4, a voltage coil 22 connected across the mains in series with resistance 23. This coil is so wound as normally to exert a compound or cumulative effect with respect to the field of coil 4, but possesses relatively few ampere turns so that the contact 16 is substantially controlled in accordance with the field of coil 4. If, however, the leads of the battery be reversed with respect to the generating system, the former will tend to discharge through the armature circuit and result in a surge of current which may open the shunt about resistance 14. Under these conditions coil 22 being reversed in polarity acts differentially with respect to coil 4 and tends to cut down the effect of the latter to the end that the contact 16 may be released into shunt completing position, thus permitting the generator field to build up quickly with reversed polarity. It is to be especially noted, however, that if during this action the shunt is held open, there is not introduced in series with the generator field a mere dead resistance, but the additional field coil 14 which although tending to cut down the reversed field current, nevertheless, provides more turns on the field winding and aids correspondingly in building up the field.

Considering first, broadly, the operation of the above apparatus, it is to be noted that upon either the voltage or the current of the generator exceeding a predetermined value, the corresponding contact 17 or 16 will be attracted, thus breaking the shunt about the resistance 14 and cutting down the field strength. This decrease in field strength will, in general, so reduce the function of the generator output which has caused the breaking of the shunt as to permit the attracted contact again to swing back into circuit-completing position, whereupon the field of the generator will again build up in strength. This action is repeated with a rapidity determined by the tendency to excess of the function by which it is caused, that is, the current or the voltage, and thus giving rise to a vibration of the contact member of greater or less frequency. By the action of the shunt as shown, a single resistance serves the purpose of regulating both the voltage and the current as separate factors, as the entire resistance is thrown in if the shunt is broken at either point and each vibrating contact may work independently of the other.

Upon the shunt being broken about a resistance in series with the field coil, there is, of course, a tendency to sparking at the break, due chiefly, to a so-called extra current arising from the self-inductive effect of the field magnet coil. By the provision of the coil 14, however, wound upon the field magnet, this sparking is materially reduced, if not substantially eliminated, by reason of the following actions:—The decrease in current in the coil 12 not only induces in its own turns a self-inductive current, but also induces an electro-motive force in the coil 14, which tends to magnetize the field 2 with the same polarity of flux as that due to the coil 12, and this temporary magnetization, due to induced current, renders slower the decrease in total magnetization of the dynamo field. This retardation of the rate at which the field strength falls, or the lines collapse, to use a figure common in this art, will decrease the self-inductive effect in the coil 12 and correspondingly lessen the tendency to spark at the break. This sparking tendency is still further lessened by reason of the induced electro-motive force in the coil 14 which tends to draw the current around the gap. The induced current, furthermore, is of such a direction that it has a tendency to jump the gap in the opposite direction from the main current and still further lessens the tendency to spark. It is believed that the above actions will be clear from a study of this apparatus and it will also be seen that the tendency of the induced current in coil 14 to sustain the field strength of the generator, as well as the gradual manner in which the ohmic resistance of this coil is interposed in series with the main field coil, will render materially smoother the regulation of both the current and the voltage of the generator output. It will, moreover, be noted that the current which is thrown through resistance 14 is not wasted, but its full effect is utilized in sustaining the field strength of the generator, thus rendering the action of the system more economical and doing away with the objectionable heating effect.

It is also to be noted that by mounting the coil 14 directly upon the generator field, the necessity for a separate coil support, with attendant loss in compactness of the apparatus, is done away with.

It will thus be seen that there is provided apparatus in which the various objects of this invention are achieved.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In apparatus of the class described, in combination, a dynamo having a field winding, an auxiliary aiding field winding on said dynamo, and means adapted substantially simultaneously to decrease the current in said first winding and divert current through said second winding.

2. In apparatus of the class described, in combination, a dynamo having a field winding, an auxiliary aiding field winding on said dynamo in inductive relation to the circuit of said first winding, a regulating magnet, and means controlled by said regulating magnet adapted substantially simultaneously to decrease the current in said first winding and increase the current through said second winding.

3. In apparatus of the class described, in combination, a dynamo having a field winding, a second aiding field winding serially connected upon said dynamo with said first field winding and in inductive relation to the circuit of said first winding, a shunt about said second winding, a regulating magnet, and means controlled by said regulating magnet and adapted upon the current in said magnet exceeding a certain value to break said shunt.

4. In apparatus of the class described, in combination, a dynamo having a field winding, a second field winding serially connected upon said dynamo with said first field winding and cumulatively wound with respect thereto and in inductive relation to the circuit of said first winding, a shunt about said second winding, a regulating magnet, and means controlled by said regulating magnet and adapted upon the current in said magnet exceeding a certain value to break said shunt, said regulating magnet being wound and connected to present a field strength substantially proportional to the voltage of said dynamo.

5. In apparatus of the class described, in combination, a dynamo having a field winding, a second field winding serially connected upon said dynamo with said first field winding and cumulatively wound with respect thereto and in inductive relation to the circuit of said first winding, a shunt about said second winding, a regulating magnet, and means controlled by said regulating magnet and adapted upon the current in said magnet exceeding a certain value to break said shunt, said regulating magnet being wound and connected to present a field strength substantially proportional to the current output of said dynamo.

6. In apparatus of the class described, in combination, a dynamo having a field winding, an auxiliary field winding on said dynamo in inductive relation to the circuit of said first winding and serially connected with said first winding, a shunt about said auxiliary winding, and means adapted to break said shunt upon either the current or the voltage of said dynamo exceeding certain values.

7. In apparatus of the class described, in combination, a dynamo having a field winding, an auxiliary field winding on said dynamo alternately energized and deënergized and in inductive relation to the circuit of said first winding and wound to tend to counteract the resultant change in field strength of the field magnets, a shunt about said auxiliary winding, a regulating magnet, and means controlled by said magnet adapted to break said shunt upon the current in said magnet exceeding a certain value.

8. In apparatus of the class described, in combination, a dynamo having a field winding, an auxiliary field winding on said dynamo alternately energized and deënergized and in inductive relation to the circuit of said first winding and wound to tend to counteract the resultant change in field strength of the field magnets, a shunt about said auxiliary winding, a coil wound and connected to present a field substantially proportional to the voltage of said dynamo, and means controlled by said coil adapted to break said shunt upon said voltage exceeding a certain value.

9. In apparatus of the class described, in combination, a shunt wound generator, an inductive resistance connected in series with the field winding of said generator and inductively related to the circuit of said winding, a shunt about said resistance, means adapted to break said shunt at a plurality of points, and separate means controlling the break at each point.

10. In apparatus of the class described, in combination, a shunt wound generator, an inductive resistance in series with the field winding of said generator and inductively related to the circuit of said first winding, a shunt about said resistance, means adapted to break said shunt at a plurality of points, means comprising a magnet wound and connected to present a field substantially proportional to the current output of said generator and controlling the breaking of said shunt at one point, and means comprising a magnet wound and connected to present a field substantially proportional to the voltage of said output and controlling the breaking of said shunt at another point.

11. In apparatus of the class described, in combination, a shunt wound generator, a resistance connected in series with the field winding of said generator, a shunt about said resistance, means adapted to break said shunt at a plurality of points, and separate means controlling the break at each point, said resistance comprising a conductor so wound upon the field magnet of said generator as to aid the shunt field.

12. In apparatus of the class described, in combination, a shunt wound generator, a resistance in series with the field winding of said generator, a shunt about said resistance, means adapted to break said shunt at a plurality of points, means comprising a magnet wound and connected to present a field substantially proportional to the current output of said generator and controlling the breaking of said shunt at one point, and means comprising a magnet wound and connected to present a field substantially proportional to the voltage of said output and controlling the breaking of said shunt at another point, said resistance comprising a conductor so wound upon the field magnet of said generator as to aid the shunt field.

13. In apparatus of the class described, in combination, a dynamo having a field winding, a second aiding field winding serially connected upon said dynamo with said first field winding and in inductive relation to the circuit of said first winding, a shunt about said second winding, a regulating magnet, and means controlled by said regulating magnet and adapted upon the current in said magnet exceeding a certain value to break said shunt, said regulating magnet being wound and connected to present a field strength substantially proportional to the voltage of said dynamo.

14. In apparatus of the class described, in combination, a dynamo having a field winding, a second field winding serially connected upon said dynamo with said first field winding and in inductive relation to the circuit of said first winding, a shunt about said second winding, a regulating magnet, and means controlled by said regulating magnet and adapted upon the current in said magnet exceeding a certain value to break said shunt, said regulating magnet being wound and connected to present a field strength substantially proportional to the current output of said dynamo.

15. In apparatus of the class described, in combination, a dynamo having a field winding, an auxiliary field winding on said dynamo alternately energized and deënergized and in inductive relation to the circuit of said first winding and wound to tend to counteract the resultant change in field strength of the field magnets, a shunt about said auxiliary winding, a coil wound and connected to present a field substantially proportional to the voltage of said dynamo, and means controlled by said coil adapted to break said shunt upon said voltage exceeding a certain value.

16. In apparatus of the class described, in combination, a dynamo having a field winding, an auxiliary field winding on said dynamo alternately energized and deënergized and in inductive relation to the circuit of said first winding and wound to tend to counteract the resultant change in field strength of the field magnets, a shunt about said auxilary winding, a regulating magnet, and means controlled by said regulating magnet and adapted upon the current in said magnet exceeding a certain value to break said shunt, said regulating magnet being wound and connected to present a field strength substantially proportional to the current output of said dynamo.

17. In apparatus of the class described, in combination, a dynamo having a field winding, an auxiliary field winding on said dynamo alternately energized and deënergized and in inductive relation to the circuit of said first winding and wound to tend to counteract the resultant change in field strength of the field magnets, a shunt about said auxiliary winding, means adapted to break said shunt at a plurality of points, means comprising a magnet wound and connected to present a field substantially proportional to the current output of said generator and controlling the breaking of said shunt at one point, and means comprising a magnet wound and connected to present a field substantially proportional to the voltage of said output and controlling the breaking of said shunt at another point.

18. In apparatus of the class described, in combination, a dynamo having a field winding, an auxiliary aiding field winding on said dynamo in inductive relation to the circuit of said first winding and serially connected with said first winding, a shunt about said auxiliary winding, and means adapted to break said shunt upon either the current or the voltage of said dynamo exceeding certain values.

In testimony whereof I affix my signature, in the presence of two witnesses.

JOSEPH BIJUR.

Witnesses:
L. A. WATSON,
ROBERT S. BLAIR.